(12) United States Patent
Abehasera

(10) Patent No.: US 11,172,785 B2
(45) Date of Patent: Nov. 16, 2021

(54) ELECTRONIC GRINDER

(71) Applicant: TRI Innovations LLC, Hallandale Beach, FL (US)

(72) Inventor: Benyamin Abehasera, Hallandale Beach, FL (US)

(73) Assignee: TRI Innovations LLC, Hallandale Beach, FL (US)

( * ) Notice: Subject to any disclaimer, the term of this patent is extended or adjusted under 35 U.S.C. 154(b) by 0 days.

(21) Appl. No.: 16/285,651

(22) Filed: Feb. 26, 2019

(65) Prior Publication Data

US 2020/0268208 A1 Aug. 27, 2020

(51) Int. Cl.
| | |
|---|---|
| *A47J 42/46* | (2006.01) |
| *B02C 18/24* | (2006.01) |
| *B02C 18/10* | (2006.01) |
| *A47J 42/40* | (2006.01) |
| *A47J 42/44* | (2006.01) |
| *A24B 7/14* | (2006.01) |
| *A47J 42/00* | (2006.01) |
| *B24B 23/03* | (2006.01) |

(52) U.S. Cl.
CPC ............... *A47J 42/46* (2013.01); *A24B 7/14* (2013.01); *A47J 42/00* (2013.01); *A47J 42/40* (2013.01); *A47J 42/44* (2013.01); *B02C 18/10* (2013.01); *B02C 18/24* (2013.01); *B24B 23/03* (2013.01)

(58) Field of Classification Search
CPC . A47J 42/46; A47J 42/44; A47J 42/00; A24B 7/14; B02C 18/10; B02C 18/24
See application file for complete search history.

(56) References Cited

U.S. PATENT DOCUMENTS

| | | | | |
|---|---|---|---|---|
| 3,044,514 A | * | 7/1962 | Schnell | B02C 18/30 241/56 |
| 3,693,941 A | * | 9/1972 | Suchy | B01F 13/0818 366/274 |
| 7,614,574 B2 | * | 11/2009 | Jakobi | B02C 18/20 241/292.1 |
| 2009/0032627 A1 | * | 2/2009 | Krasznai | A47J 42/26 241/36 |
| 2013/0062444 A1 | * | 3/2013 | Jensen | B02C 18/0007 241/30 |
| 2016/0106262 A1 | * | 4/2016 | Mroue | A47J 42/30 241/79 |
| 2016/0114331 A1 | * | 4/2016 | Young | B02C 13/09 241/37 |
| 2017/0297033 A1 | * | 10/2017 | Li | B02C 18/24 |
| 2018/0333007 A1 | * | 11/2018 | Ganahl | A47J 31/005 |

* cited by examiner

*Primary Examiner* — Faye Francis
(74) *Attorney, Agent, or Firm* — Berger Singerman LLP; Geoffrey Lottenberg

(57) ABSTRACT

An electronic grinder powered by a smartphone has an electronics housing removably attached to a container section. The electronics housing has a motor and a microcontroller powered by a smartphone connected by a universal serial bus connector. The container section is sealed at the top by an openable, swivel-mounted cap. The motor has a blade that extends into the container section. The blade connected to the motor by a magnetic connection and the blade is configured to grind material disposed in the container section when the container section is closed.

9 Claims, 3 Drawing Sheets

ELECTRONIC GRINDER

CROSS REFERENCE TO RELATED APPLICATIONS

N/A

FIELD OF THE INVENTION

The present invention relates to the technical field of grinders, more particularly to an electronic grinder adapted for grinding and pulverizing herbs and other materials.

BACKGROUND OF THE INVENTION

In daily life, people gradually begin to have personalized demands for smoking a small amount of tobacco or refined tobacco, hemp plants, hemp flowers, spices and herbs. Most of these products have to be pulverized or ground in order to effectively smoke. When grinding or pulverizing a variety of herbs, people have different requirements on the size and shape of the blades due to the difference in dryness, hardness and viscosity of different herbs. However, existing rotary shaft grinders usually have the blade fixedly connected to the shaft, therefore the blade cannot be easily replaced, thereby limiting the user to a single mode of pulverization. Additionally, portability has become a key market force in many categories, with users desiring small and more feature-packed electronic devices to serve their daily needs. Accordingly there is a need to improve upon the existing art and provide a more versatile and portable electronic grinder.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
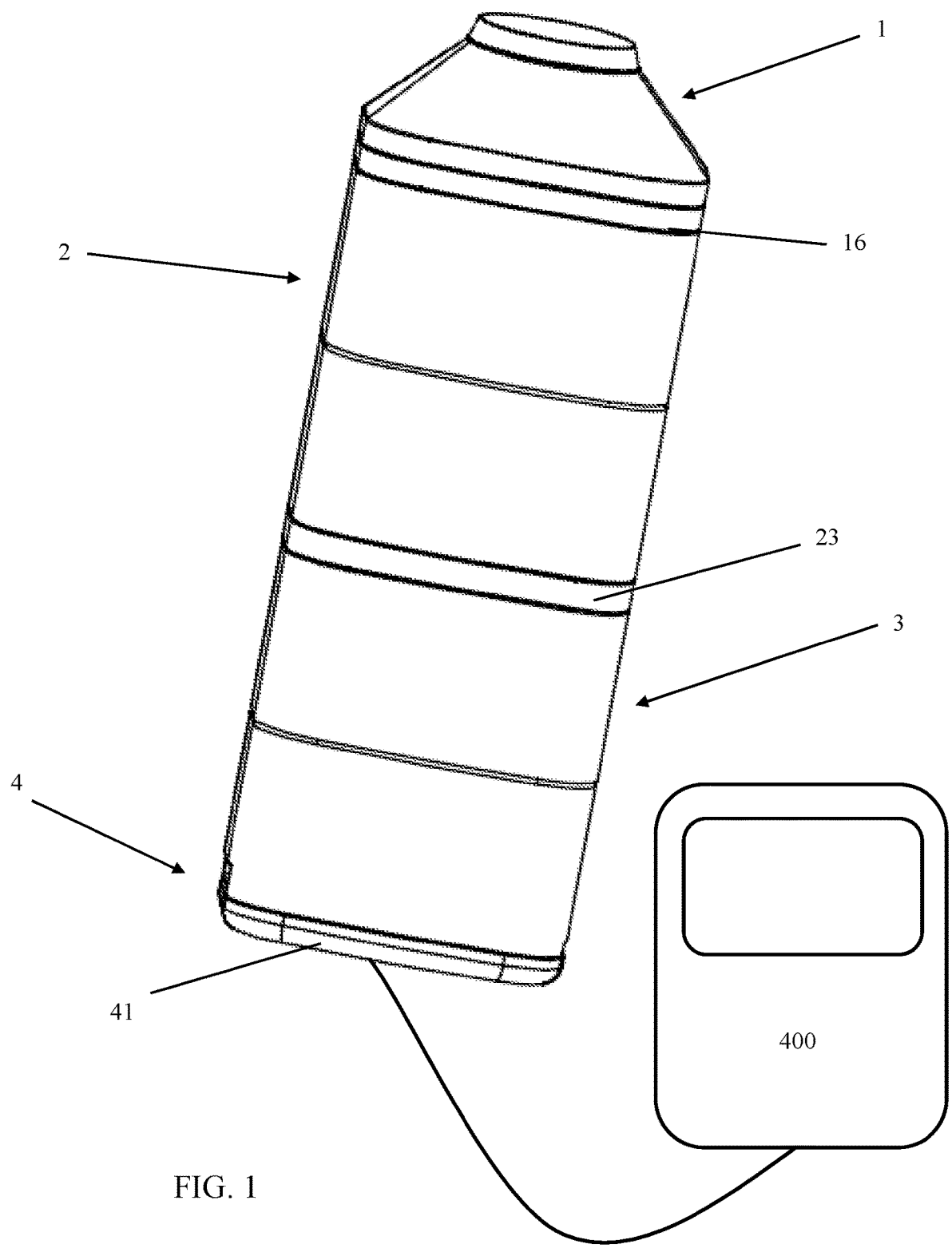
FIG. 1 is a perspective view of the grinder.
Figure 2:
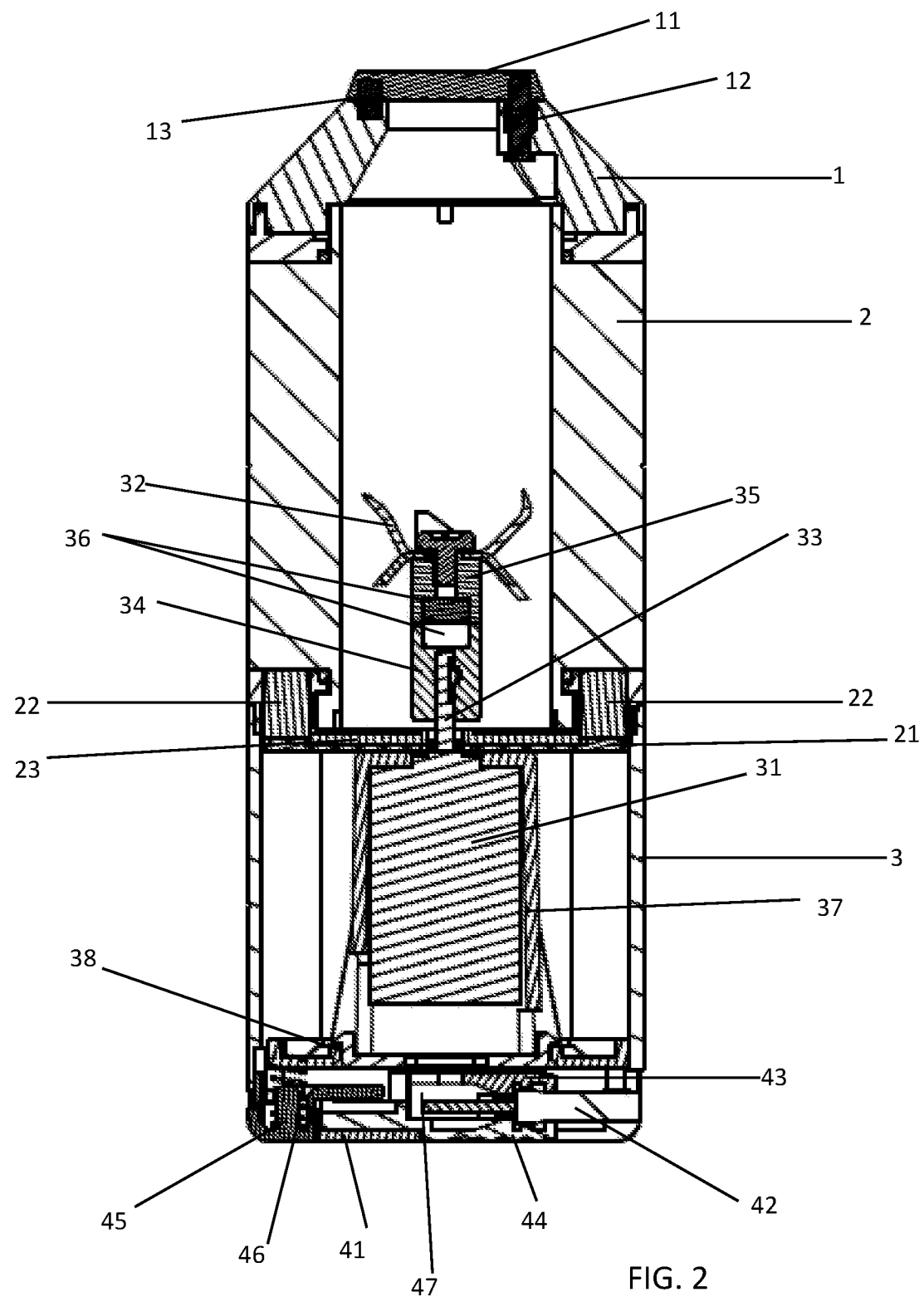
FIG. 2 is a cutaway view of the grinder.
Figure 3:
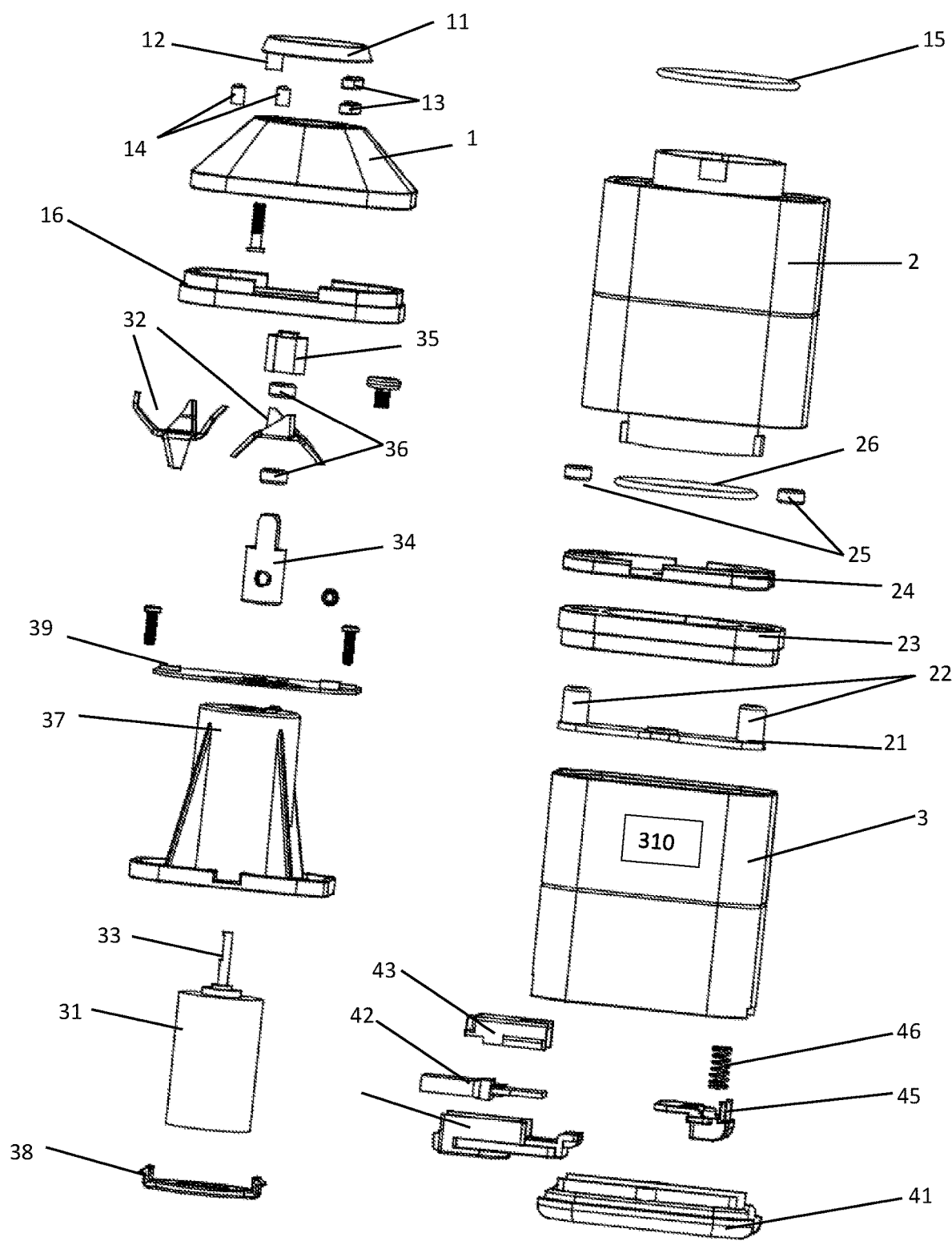
FIG. 3 is an exploded view of the grinder.

Referring to FIGS. 1-3, the multi-function electronic grinder of the present invention comprises a cap section 1, a container section 2, an electronics housing 3, and a connector section 4. In some embodiments, these components are removably engaged by snap fit, threads, magnetic connection, or the like.

The electronics housing 3 comprises and contains the various electronic components of the grinder including a motor 31 and related electronic components. The motor 31 drives a blade 32 by way of a drive shaft 33 extending upward from the motor 31 and disposed through the housing 3. In some embodiments, the blade 32 is removably attached to the drive shaft 33 such that the blade can be removed for cleaning or replacement. In some embodiments, the blade 32 is magnetically but removably attached to the drive shaft for easy manual replacement. This is accomplished by a lower connector 34 attached to the drive shaft 33 and an upper connector 35 attached to the blade 32. Each of the lower connector 34 and upper connector 35 include magnets 36 to provide the releasable magnetic connection. In some embodiments, the motor 31 is retained by a motor housing 37 disposed with the electronics housing 3. A clip 38 seats the motor 31 within the motor housing 37 and a bracket 39 secures the motor housing 37 to the electronics housing 3. The blade 32 may comprise various configurations two examples of which are shown in FIG. 3.

The connector section 4 comprises an end clip 41 which connects to the bottom of the electronics housing 3. A slideable connector 42 is disposed between an upper clip 43 and a lower clip 44. In some embodiments, the connector 42 comprises a universal serial bus port (any of the various USB protocols including B, mini-B, micro-B, USB-C, or the like) and is configured to receive power from an external power supply (not shown) such as a phone with a battery or charger. In other embodiments the connector 42 comprises a Lightning connector or other multi-pin or barrel-type power connection known in the art. In some embodiments, a spring housing 45 includes a spring 46 wherein the spring housing 45 springingly engages the connector 42 such that the connector 42 is selectively deployable out of the housing 4. The spring housing 45 in combination with the spring 46 is operable to such that the connector is locked in position whether retracted or deployed such that the connector 42 does not inadvertently move. In some embodiments the spring housing 45 comprises an external button to lock/unlock the connector 42.

In some embodiments a microcontroller 47 controls the power flow at the connector 42 and in some embodiments comprises a processor (CPU), memory, and control programming for the various input and output peripherals. In some embodiments the microcontroller 47 is in electrical communication with the motor 31 in order to pass power from connector 42 thereto and to provide control commands therefor. The microcontroller is operably configured to provide over-load protection, safety protection based on temperature or speed, and can manage smart charging functionality which allows the grinder to be operated while charging.

In some embodiments, the container section 2 is removably mated to the electronics housing 3 by a magnetic connection. A sealing bushing 21 seals the top of the electronics housing and include bi-lateral magnet posts 22. A spacer 23 sits over the sealing bushing 21 and a retention clip 24 sits over the spacer 23. Magnets 25 are disposed on either side of the bottom of the container section 2. In some embodiments a grommet 26 provides a tight fitment of the container section 2 onto the housing 3. When the container section 2 is attached to the electronics housing 3, the blade 31 is seated inside the container 2 such that it can effectively grind and pulverize material placed in the container section.

The top of the container section 2 is open and terminates at cap 1, which includes a swivel-mounted cover 11. In some embodiments, the swivel-mounted cover 11 is rotatably mounted to the cap 1 by a pin 12. In some embodiments, the cover 11 is magnetically but removably latched to the cap 1 by one or more magnets 13 so that it remains closed until sufficient manual force is applied to break the magnetic connection. The cap 1 is thus openable to provide a point of entry and exit for material into and out of the container section 2. In some embodiments the cap 1 is spring loaded by one or more springs 14 to assist in the opening and closing action. An upper grommet 15 sits between the cap 1 and the top of the container section 2 to provide a tight seal and fitment. A spacer 16 is attached underneath the cap 1 between the cap 1 and the container 2.

In some embodiments the grinder is operably not only to grind and pulverize material placed in the container but also to dispense the material. In some embodiments, the blade 32 can be configured to function as a grinder when rotating in one direction and to function as a fan when rotating in another direction, or it can accomplish same depending on whether the cover 11 is open or closed. In some embodiments, the blade 32 comprises a fan-like structure to facilitate air flow as well as function as a grinding blade. Accordingly, the direction of the blade 32 can be reversed in order to force air out of the chamber and up toward to the cap 1 in order to assist in expelling and dispensing ground material from the chamber. However, in other embodiments, the blade can function both as grinder and a fan when rotating in the same direction and whether the blade functions to dispense material out of the chamber is dictated by whether the cover 11 is open.

In use, the user removes the inserts material to be ground through the open cap 1 into the container section 2. With the container section 2 secured to the electronics housing 3 and the swivel-mounted cover 11 closed, the user can activate the motor 31 by connecting connector 42 to a power source such as a computing device (smartphone 400, tablet, personal computer) or AC adapter. If the user desires to dispense the material in the container section, the cover 11 is opened and again the motor is activated and in a dispensing mode will generate air flow to expel the contents of the container 2 out and through the cap 1.

The materials selected for the grinder of the present invention are not particularly limiting however in some embodiments at least a portion of the container 2 is comprised of a transparent material so that the user can easily observe the contents therein.

It is appreciated and understood that the present invention provides an easy to use, compact electronic grinder that is capable of effectively pulverizing and dispensing a small amount of herb such as tobacco, hemp, Chinese herbal medicine, spices etc. for smoking or other uses. Moreover, the use of the magnetic shaft connector between the blade 31 and the drive shaft 33 provides an easy and convenient way to remove the blade for cleaning or replacement with a blade of a same or different type, depending on user preferences and the target material to be pulverized.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A smartphone-powered electronic grinder, comprising:
   a electronics housing removably attached to a container section;
   the electronics housing including a motor configured to drive a blade;
   wherein the blade extends into the container section;
   wherein the blade is removably connected to the motor by a magnetic connection;
   wherein the blade is configured to grind material disposed in the container section when the container section is closed; and
   wherein the motor is powered by a smartphone connected to the electronics housing by a connector.

2. The electronic grinder of claim 1, wherein the main housing is sealed at the top by an openable cap.

3. The electronic grinder of claim 2, wherein the lower cap includes a swivel mounted cover to selectively open and close the cap.

4. The electronic grinder of claim 3, wherein the swivel mounted cover is magnetically latched to the cap to removably retain the cover against the cap.

5. The electronic grinder of claim 1, wherein the electronics housing includes a microcontroller connectable to the smartphone through the connector, wherein the microcontroller is powered by the smartphone and is configured to control the motor.

6. The electronic grinder of claim 1, wherein the connector comprises a universal serial bus connector.

7. The electronic grinder of claim 1, wherein the connector comprises a lightning connector.

8. The electronic grinder of claim 1, wherein the connector is retractable.

9. An electronic grinder, comprising:
   an electronics housing removably attached to a container section, the electronics housing including a motor configured to drive a blade and a microcontroller, wherein each of the microcontroller and the motor are powered by a smartphone connected thereto by a retractable universal serial bus connector, and wherein the microcontroller is configured to operate and control the motor;
   the electronics housing sealed at the top by an openable, swivel-mounted cap;
   wherein the blade extends into the container section, wherein the blade is removably connected to the motor by a magnetic connection; and
   wherein the blade is configured to grind material disposed in the container section when the container section is closed.

* * * * *